United States Patent
Hestermeyer et al.

(10) Patent No.: US 9,545,946 B2
(45) Date of Patent: Jan. 17, 2017

(54) STEERING SYSTEMS AND METHODS FOR SUPPORTING THE STRAIGHT RUNNING OF A VEHICLE

(71) Applicant: FORD GLOBAL TECHNOLOGIES, LLC, Dearborn, MI (US)

(72) Inventors: Thorsten Wilhelm Hestermeyer, Leverkusen (DE); Sergio Trimboli, Cologne (DE); Jens Dornhege, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/516,194

(22) Filed: Oct. 16, 2014

(65) Prior Publication Data
US 2015/0105981 A1    Apr. 16, 2015

(30) Foreign Application Priority Data

Oct. 16, 2013    (DE) .................. 10 2013 220 947

(51) Int. Cl.
*B62D 5/04* (2006.01)
*B62D 6/04* (2006.01)

(52) U.S. Cl.
CPC ........... *B62D 5/0466* (2013.01); *B62D 5/0463* (2013.01); *B62D 6/04* (2013.01)

(58) Field of Classification Search
CPC ........ B62D 5/0466; B62D 5/0463; B62D 6/04
See application file for complete search history.

(56) References Cited

U.S. PATENT DOCUMENTS

| | | | |
|---|---|---|---|
| 6,965,820 B2 | 11/2005 | Amberkar et al. | |
| 7,725,227 B2 | 5/2010 | Pattok | |
| 2009/0030575 A1 | 1/2009 | Kleinau et al. | |
| 2011/0029200 A1 | 2/2011 | Shah | |
| 2012/0265403 A1* | 10/2012 | Svensson | B60K 31/0008 701/41 |

FOREIGN PATENT DOCUMENTS

| | | |
|---|---|---|
| DE | 198 24 914 A1 | 12/1999 |
| DE | 10 2006 022 663 A1 | 11/2007 |
| DE | 10 2006 057 084 A1 | 6/2008 |
| DE | 10 2009 028 181 A1 | 2/2011 |
| FR | 2 843 085 A1 | 2/2004 |

OTHER PUBLICATIONS

Examination Report issued Jun. 2, 2014 in related German Patent Application No. 10 2013 220 947.9.

* cited by examiner

*Primary Examiner* — Basil T Jos
(74) *Attorney, Agent, or Firm* — Jones Robb, PLLC; Raymond L. Coppiellie

(57) ABSTRACT

A steering system is provided to support a straight running of a vehicle. The steering system included an active steering assistance system, a support torque section, and a correction section. The support torque section is configured to calculate a supporting torque based on a steering torque applied to a steering wheel of the vehicle. The correction section is configured to calculate a correcting torque on a basis of a progressively calculated supporting torque. The active steering assistance is configured to be controlled on the basis of a control torque based upon a superimposition of the supporting torque with the correcting torque.

13 Claims, 3 Drawing Sheets

STEERING SYSTEMS AND METHODS FOR SUPPORTING THE STRAIGHT RUNNING OF A VEHICLE

CROSS REFERENCE TO RELATED APPLICATIONS

This application claims priority to German Application No. 10 2013 220 947.9, filed on Oct. 16, 2013, the content of which is hereby incorporated by reference in its entirety.

TECHNICAL FIELD

The present disclosure relates to systems and methods for supporting the straight running of a vehicle.

BACKGROUND

Assistance systems may be used with steering device of vehicles, such as motor vehicles. Assistance systems may range from, for example, power steering systems to independently acting steering systems for use in parking situations. For instance, support systems and assistance systems for the steering devices of vehicles, especially of motor vehicles, range from almost fully established power steering to automatic active steering systems, e.g. in parking situations. Such systems increasingly intervene actively in the steering process, even while travelling, in order to increase the ride comfort and safety for the occupants.

Power steering systems differ in the form of their drive. Hydraulically (HPS="Hydraulic Power Steering") and electrohydraulically (EHPS="Electro-Hydraulic Power Steering") supported steering systems generally boost the manual steering wheel torque applied by a driver to enable a more comfortable steering function. Electromechanically supported steering systems (EPAS="Electro Power Assisted Steering") actively apply steering torques to exert assistance functions and to assist the driver in his control of the vehicle.

Conventional assistance systems may be used to facilitate maintaining the straight running of the vehicle for a person steering the vehicle. Such systems reduce the work required by a driver and support the driver in relation to the force to be exerted to control of a vehicle during travel. However, changing external influences place high demands on such systems, requiring continuously adapted and complementary interaction of actions and reactions by the driver and the assistance systems. Thus, particularly for vehicles with an EPAS system, demands may be placed upon a driver during normal straight running conditions if no additional automatic correction is performed to compensate the pulling action and drift (PDC="Pull Drift Compensation") that may occur.

As used herein, a pulling action (steering pull) requires a noticeable force to be applied to a steering wheel to enable straight running. As used herein, drift means the readiness of the vehicle to deviate from the straight direction of travel during hands-free travel by a driver. The driver is forced to apply a constant counter steering torque, via the steering wheel, when traveling on humped roads with lateral cambers and/or a road having a generally steep slope. Further, vehicle geometry misalignments, such as camber/caster split angle, toe angle, tire aligning torque, may influence the straight running of a motor vehicle, while requiring a constant counter steering torque to be applied by the driver. In order to reduce such efforts, appropriate PDC systems have been incorporated as a feature in modern EPAS systems.

In principle, a distinction is to be made between long-term and short-term corrections regarding the torques to be applied by the driver or the respective system. Long-term corrections relate to unavoidable effects intrinsic to the vehicle, such as a faulty or deteriorating vehicle setting. These effects can result, for example, from different tire air pressures or a displacement of the steering geometry. Short-term corrections are caused by external influences, such as, for example, a suddenly occurring side wind, a road camber, or the gradient of a road. These influences can affect the driving dynamics and lead to vehicle drift.

Conventional methods and systems for PDC support have already contributed to a significant improvement in safety and comfort. However, these methods and systems are not suitable for compensating necessary corrections due to vehicle design settings. Thus, these methods and systems cannot be used, for example, to check whether any wheels are positioned incorrectly and to make corresponding corrections. Nevertheless, newly manufactured vehicles may exhibit vehicle design settings that lead to compensations for straight running of a vehicle, such as due to manufacturing tolerances.

SUMMARY

In accordance with various exemplary embodiments, the present disclosure contemplates a method for supporting a straight running of a vehicle that comprises a steering system with active steering assistance system, the method comprising calculating a supporting torque based in part on a steering torque applied to a steering wheel of the vehicle. The method further comprises progressively calculating the supporting torque based in part on the calculated supporting torque. The method further comprises calculating a correcting torque based in part on the progressively calculated supporting torque. Further, the method comprises controlling the active steering assistance system based on a control torque calculated by superimposing the supporting torque with the correcting torque.

In accordance with various exemplary embodiments, the present disclosure contemplates a steering system to support a straight running of a vehicle. The steering system comprises an active steering assistance system, a support torque section, and a correction section. The support torque section is configured to calculate a supporting torque based on a steering torque applied to a steering wheel of the vehicle. The correction section is configured to calculate a correcting torque on a basis of a progressively calculated supporting torque. The active steering assistance is configured to be controlled on the basis of a control torque comprising a superimposition of the supporting torque with the correcting torque.

In accordance with various exemplary embodiments, the present disclosure contemplates a steering system to support a straight running of a vehicle. The steering system comprises a support torque section, a correction section, an interface, and an active steering assistance system. The support torque section is configured to calculate a supporting torque based on a steering torque applied to a steering wheel of the vehicle. The correction section is configured to calculate a correcting torque on a basis of the calculated supporting torque and driving dynamics data of the vehicle. The correction section is operatively coupled with at least one sensor that detects the driving dynamics data. The interface is configured to superimpose the correcting torque with the calculated supporting torque. The active steering assistance system is configured to be controlled on the basis of a control torque to support the straight running of the vehicle. The control torque is based upon the superimposed correcting torque and the calculated supporting torque.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the present disclosure are explained in detail below using an exemplary embodiment illustrated in the following figures. In the figures.

DESCRIPTION OF THE EMBODIMENTS

Figure 1:
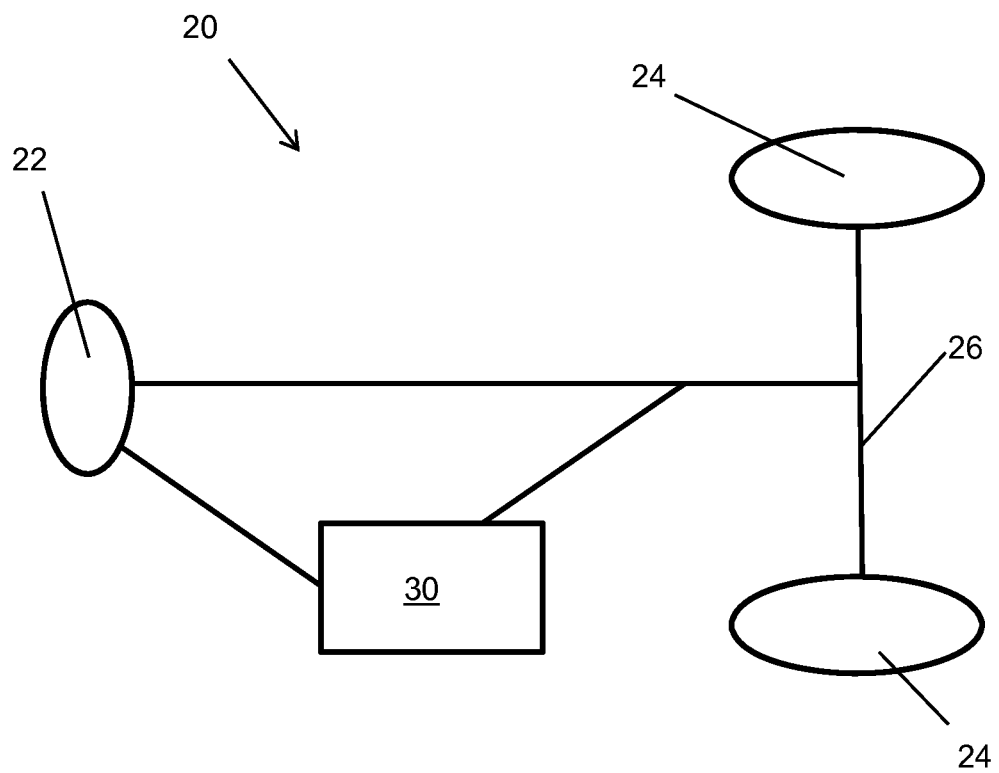
FIG. 1 schematically depicts a power steering system, according to an exemplary embodiment in accordance with the present disclosure.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the disclosure.

The various exemplary embodiments described herein contemplate methods and steering systems for supporting the straight running and/or directional stability of a vehicle. According to an exemplary embodiment of a method of supporting the straight running of a vehicle, a support torque section is configured to calculate a calculated supporting torque on the basis of a torque applied to the steering wheel of a vehicle. The calculated supporting torque is superimposed with a calculated correcting torque. The correcting torque is calculated on the basis of a progressively calculated supporting torque. The correcting torque is calculating by using continuous characteristic field control based upon driving dynamics data of the vehicle, according to an exemplary embodiment. A steering system for a vehicle may comprise a correction section that receives the calculated correcting torque and weighs the calculated correcting torque with a first factor. The first factor is based upon the driving dynamics data, according to an exemplary embodiment. The correction section may comprise a control system to further weigh the weighed calculated correcting torque by a second factor to calculate the correcting torque. The second factor is based upon the driving dynamics data, according to an exemplary embodiment.

Against this background, an object of the various exemplary embodiments described herein is to provide methods and systems for supporting the straight running of a vehicle, wherein the straight running of a vehicle is supported via a correcting torque that can be adapted to a supporting torque that facilitates vehicle control to an enhanced degree, as well as corresponding vehicles including such systems.

The various exemplary embodiments described herein relate to supporting the straight running and directional stability of vehicles, especially motor vehicles, which include a steering system having active steering assistance system. According to an exemplary embodiment, the steering system is an EPAS system. The method is designed such that it can be combined with electromechanical steering assistance (EPS="Electric Power Steering") systems, according to an exemplary embodiment, because these systems are widely used due to their relatively inexpensive design and because they can be accurately controlled. The steering system can apply steering forces independently of a control system.

In accordance with the present disclosure, a supporting torque is calculated for the controllable wheels of a vehicle. The supporting torque is based upon a steering torque applied to the steering wheel of the vehicle by a driver. The supporting torque can be produced, for example, by a suitable drive, e.g., a servo motor or other torque-producing device familiar to one of ordinary skill in the art. A steering movement is initiated by the manual rotation of a steering wheel of the vehicle, wherein the supporting torque is affected by the rotation of the steering wheel. In accordance with the present teachings, the magnitude of the supporting torque, which is used to boost the manual torque of the steering wheel, is dependent on the speed of the vehicle. Thus, the contribution of the supporting torque to the required steering movement will be smaller if the vehicle is in motion, particularly at higher speeds. The dependence of the magnitude of the supporting torque upon vehicle speed is used for driving safety. In particular, potential sudden steering manoeuvers can adversely affect control of the vehicle and should be prevented, particularly at high speeds. Thus, providing a reduced contribution reduces the opportunity for such adverse effects. In contrast, the magnitude of the supporting torque is correspondingly greater if high steering forces are necessary, such as when a vehicle is at rest or when the vehicle is traveling at low speeds.

In order to provide a supporting torque sufficient to improve the overall straight running of the vehicle, the steering assistance is not directly controlled with the supporting torque but with a calculated control torque. According to an exemplary embodiment, the control torque includes the magnitude of a demanded support and a component to compensate for the currently present drift and/or of the pull on the steering of a vehicle. Consequently, a control torque used to control a steering assistance system comprises the supporting torque and a calculated correcting torque. The correcting torque may be used in the various exemplary embodiments described herein to provide a component for compensation to achieve the straight running of a vehicle. As disclosed herein, the control torque comprises a superimposition of the supporting torque and the correcting torque.

The torque applied to the steering wheel (e.g., an actual torque applied to the steering wheel by a driver) is not directly input as a variable for the calculation of the correcting torque, as is common in a conventional PDC system. Instead, a previously calculated supporting torque is used as an input variable for the calculation of the correcting torque. According to an exemplary embodiment, the "previously calculated supporting torque" refers to the torque calculated by a support torque section at the time a control torque is calculated for the straight running of a motor vehicle. For example, the previously calculated supporting torque is a supporting torque calculated during the same control cycle a control torque is calculated.

The use of a previously calculated supporting torque in this manner may be referred to as a progressively calculated supporting torque, which is contemplated by the various exemplary embodiments described herein. A progressively calculated supporting torque will be explained by the following. Conventional PDC systems typically begin calculating compensation torque for straight driving only if some binary conditions are true (e.g., a steering wheel angle is within a narrow angular range that is close to zero degrees, the vehicle speed is above a certain threshold, the torque applied to a steering column is within a certain range close to zero Newton-meters, and other conditions to assess wither a compensation torque should be applied). In other words, a compensation torque is applied under certain conditions and not applied under other conditions. However, straight driving conditions result from actual vehicle data using continuous values (e.g., not Boolean or binary) that indicate a level of confidence of straight ahead conditions. In general, the higher a numerical value corresponding to straight running conditions, the higher the probability that the vehicle is driving straight ahead. A higher numerical value may also indicate a driver's desire for straight running of the vehicle. If the numerical value is above zero, a PDC controller begins to learn compensation torque (e.g., more accurately calculate compensation torques based upon vehicle driving data across a continuous range), while progressively calculating a torque from the actual support torque. The application of PDC torque (e.g., summing a correcting torque with a calculated supporting torque) is as strong as the value of a second numerical value (e.g., correcting torque), the magnitude of which identifies the possibility of compensation torque application. Further, the various exemplary embodiments contemplate applying the torque in a manner so the torque is not applied under a binary scheme in which the torque is applied under some conditions and not under other conditions. The higher the second value, the stronger the PDC compensation torque will be when summed (up to the previously learned value).

The use of a progressively calculated supporting torque to calculate a control torque provides particular advantages. In conventional systems, very small amplitudes of the manual torque applied to a steering wheel do not trigger a supporting torque, such as due to the binary nature of how a torque is used for corrections. Using a progressively calculated supporting torque takes advantage of the circumstance in which small deviations in the correcting torque can be steadied, failing the triggering of a supporting torque, such that any variations do not disturb the driver. A series of investigations has demonstrated that steering pulls with very small amplitudes are not perceived to be disturbing by a driver. If, however, there is greater steering pull, the progressively rising steering assistance provided by the supporting torque leads to a faster rise of the correcting torque towards a target value. When a decrease in the steering pull occurs, the progressively rising steering assistance is then automatically reduced.

In accordance with one aspect of the present disclosure, current driving dynamics data is supplied to a controller for a steering system. The driving dynamics data may be provided from sensors, such as existing sensors already present in the vehicle. For example, at least one sensor is provided that is designed to detect data for the respective current driving dynamics of the vehicle. The sensor may be a sensor used to detect, for example, yaw rate data, lateral acceleration data, steering angle data, wheel revolution rate data, vehicle speed data, torsion rod torque data, steering wheel position angle data, rack displacement data, rack rate data, and/or other vehicle dynamics data familiar to one of ordinary skill in the art. For example, yaw rate and lateral acceleration can be determined and output by a system present in the vehicle having an electronic stability program (ESP), electronic stability control (ESC), or dynamic stability control (DSC).

The driving dynamics data may comprise, for example, yaw rate, lateral acceleration, steering angle, revolution rate of the wheels, vehicle speed, torsion rod torque, steering wheel position angle, steering rack displacement, steering rack rate, and/or other vehicle dynamics data familiar to one of ordinary skill in the art. The current driving dynamics data may be used in a calculation to determine an actual control torque. According to one exemplary embodiment, yaw rate data, lateral acceleration data, and steering wheel position angle data are used provide information about the current straight running of a vehicle.

As disclosed herein, a steering system is configured to sample selected vehicle dynamics data at a determined sampling rate. For example, the vehicle dynamics data is sampled so the data is as current as possible so that the various exemplary embodiments described herein can detect any unintended changes of the driving dynamics with minimal time delay or no time delay. A person skilled in the art may adapt a sampling rate for acquiring the vehicle dynamics data, such as according to a targeted torque compensation. According to an exemplary embodiment, the sampling rate may range from, for example, about 10 ms to about 100 ms. According to an exemplary embodiment, the sampling rate can be adjusted dynamically. For example, the sampling rate may be dynamically adjusted according to a value of vehicle dynamics data. According to an exemplary embodiment, the sampling rate may be dynamically adjusted according to the speed of a vehicle.

In accordance with the present disclosure, a continuous characteristic field control is used to calculate a control torque. Continuous characteristic field control enables an enhanced estimation of a respective driving state and/or driving situation of a vehicle. For example, instead of using a binary mode of control based upon the detection of whether a vehicle is in a straight running state, as in conventional systems, continuous characteristic field control depends upon the continuous values of input driving dynamics data.

A characteristic field, also known as a characteristic curve field, is represented by two or more single characteristic curves. The individual characteristic curves thus depend on different input variables. For example, a characteristic curve can be activated on the basis of a defined parameter as an input variable, such as to exploit a dependency on two or more variables. Thus, known driving situations and their profiles can be recorded in a characteristic field and used to carry out a control typically required in response to an input variable. Characteristic curve field control may be exploited to utilize complex, multidimensional characteristic fields, such as via multiplication or determining the average value of individual, normalized characteristic curves. Furthermore, it is conceivable to normalize the driving dynamics input data and to deliver a previously defined multidimensional function. Characteristic field control, in comparison to conventional binary identification of straight running, can better resolve the compromise that occurs with data acquisition with regard to controlling steering pull, due to an enhanced degree of weighing according to the best data, with little influence from boundary data.

According to an exemplary embodiment, a previously calculated supporting torque can be initially weighed. For example, a previously calculated supporting torque can be weighed by a factor $\lambda$. In other words, the value of a previously calculated supporting torque is multiplied by the factor $\lambda$. According to an exemplary embodiment, the factor $\lambda$ is derived from at least one value of the current driving dynamics data for the vehicle. The factor $\lambda$ comprises an arbitrary complex function of the driving dynamics data with a single variable. For example, the factor A represents the product of arbitrary complex functions of the driving dynamics data, with each function comprising a single variable. This factor $\lambda$ can be calculated as follows:

$$\text{Factor } \lambda = f1(SWA) * f2(Vx) * \ldots * fi(xi) * fn(xn)$$

Here "fi(xi)" represents arbitrary complex functions of the driving dynamics data, each function having a single variable, with "i" ranging from 1 to n. In this case "SWA" represents the steering angle and "Vx" represents the longitudinal vehicle speed. Thus the factor $\lambda$ has a dependency on the steering angle (SWA) and/or on the current longitudinal vehicle speed (Vx), according to an exemplary embodiment.

An additional factor can be used to weigh a correcting torque. According to an exemplary embodiment, an additional factor $\mu$ is used to weigh a calculated correcting torque. For example, factor $\mu$ is derived from at least one value of the current driving dynamics data. Factor $\mu$ thereby represents the product of arbitrary complex functions of the driving dynamics data, each of which comprises a single variable. While the first factor $\lambda$ is used as a weighing factor for optimal identification of the amplitude and direction of the steering pull, factor $\mu$ can determine the driving situations in which the identified steering pull is to be compensated.

According to one aspect of the present disclosure, the supporting torque previously weighed by the factor $\lambda$ is processed by a control system before the torque processed by the control system is weighed with the additional factor $\mu$. The control system uses, for example, an arbitrary complex function of the supporting torque already weighted by the factor $\lambda$ to generate a correcting torque in the form of the thus modified supporting torque. The control system is implemented as an averaging function or as an integrator. According to an exemplary embodiment, the control system can be defined as a function in a discrete-time system as follows:

$$Tpd(t+1) = Tpd(t) + K * Tw(t)$$

Here, "Tpd" represents the internal state of the control system and "Tw" represents the previously calculated supporting torque, which has been weighed with the factor $\lambda$. Furthermore, "K" represents an arbitrary parametric function, such as, for example, a multiplication factor, and "t" represents the respective current time and "t+1" represents an initial discrete time step. Using the control system to calculate a torque based upon the previous calculated supporting torque weighed by the factor $\lambda$ advantageously enables the exclusive use of the supporting torque as well as characteristic curve controlled weighing, in comparison to the conventional use of the manual torque and binary situation selection to calculate a correcting torque. As a result, the steering system comprises active steering assistance system as well as a calculation device including a support torque section to calculate a support torque. The calculation device is designed to calculate a required supporting torque on the basis of at least a steering torque applied to a steering wheel of the vehicle. In other words, the calculation device is used to determine the support applied by a driver in order to support the steering movement demanded by a person controlling vehicle.

The various exemplary embodiments described herein further contemplate a correction section that is configured to calculate a correcting torque based on the previously calculated supporting torque. The previously calculated supporting torque used by the correcting device is a progressively calculated supporting torque. As a result, the various exemplary embodiments described herein contemplate compensating for the pull on the steering wheel and/or the drift of the vehicle by using a method that self-corrects relative to a demanded steering force support. The actual steering assistance is controllable by a control torque that comprises a superimposition of the supporting torque with the correcting torque calculated by the correction section.

According to an exemplary embodiment, the correction section comprises a "single input—single output" control system. For example, the control system comprises a single input and a single output. The control system is designed to receive an input signal of the calculated supporting torque, weigh the calculated supporting torque with the driving dynamics data, calculate a correcting torque, and to further weigh the calculated correcting torque with current driving dynamics data so the weighed correcting torque is provided as an output signal, according to an exemplary embodiment. The output signal may be provided, for example, as a single value. The output signal is sent to the steering assistance device, according to an exemplary embodiment, so the steering assistance may be ultimately controlled by the weighed output signal in the form of the control torque. According to an exemplary embodiment, the weighed correcting torque is summed with the calculated supporting torque and provided to the steering assistance device and used as a basis for a control torque to facilitate straight running of a vehicle.

The "single input—single output" control system does not, in the technical control sense, exclude the control system from being reset to its original value, such as via external signals or outputting internal functional states. As a result, the control system may include an input to facilitate the resetting of the control system to its original value or so one or more of its original values can be used.

Turning now to the drawings, FIG. 1 illustrates an exemplary embodiment of a power steering system 20 that includes a steering wheel 22, wheels 24 coupled to an axle 26, and a control unit 30. Control unit 30 may issue commands to control power steering system 20, such as to issue commands to a motor (not shown) actuating power steering for wheels 24. Control unit 30 may further be utilized as a PDC system and to control directional stability of a vehicle including power steering system 20 according to the various teachings described herein. A power steering assist system includes a PDC system for directional stability of a motor vehicle. The steering assistance system can be, for example, an EPAS system or EHPS system.

Figure 2:
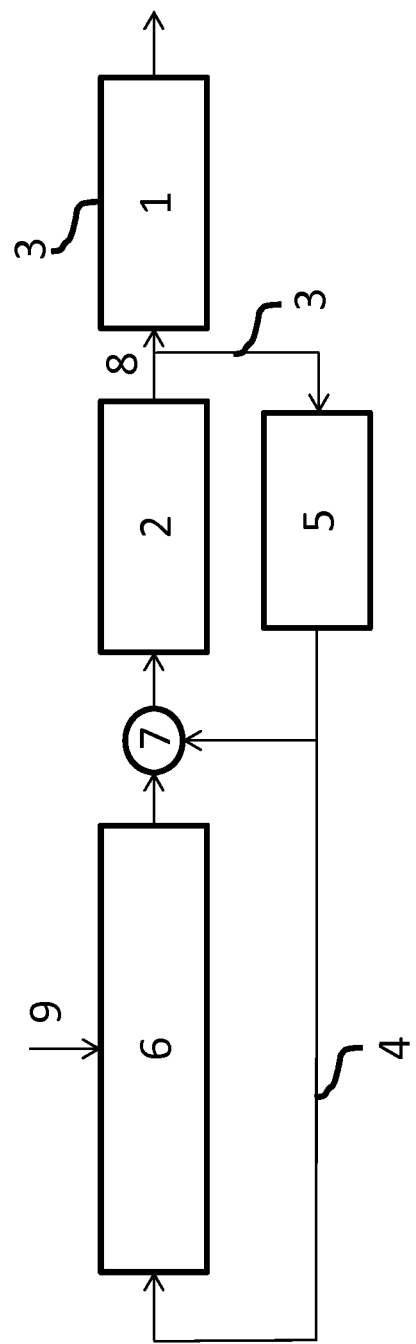
FIG. 2 depicts a schematic process of a method to support the straight running of a vehicle, according to an exemplary embodiment.

FIG. 2 schematically depicts a method for supporting the straight running of a vehicle 1 including a steering system, such as the exemplary steering system shown in FIG. 1. The vehicle 1 includes a manually operated steering wheel (not shown) and is coupled to an active steering assistance system 2. The active steering assistance system 2 is an EPAS system.

A required supporting torque 4 is initially calculated based on a steering torque 3 applied to the steering wheel. The various exemplary embodiments described herein contemplate the steering torque 3 as a torque applied by a person controlling the vehicle 1 in order to achieve straight running of the vehicle 1. The straight running of the vehicle is influenced by, for example, vehicle settings, such as caster, camber, toe, and/or due to other influences, such as road surface elevations and/or tire settings. Because of this, countermeasures are used to counteract the pull on the steering wheel arising from these influences and the drift of the vehicle 1. As a result, the steering torque 3 is required to be applied to the steering wheel in a substantially constant manner.

In accordance with the present teachings, the manually applied steering torque 3 is boosted by a support torque section 5 to calculate a supporting torque 4. In conventional systems, control of a steering assistance system 2 takes place based upon the supporting torque 4. The various exemplary embodiments described herein contemplate using a correction section 6 to calculate a correcting torque by taking into account the calculated supporting torque 4. A correcting torque is calculated by the correction section 6 on the basis of the current supporting torque 4 and taking into account the current driving dynamics data 9 of the vehicle 1, in order to support the straight running of the vehicle 1. For example, the calculated correcting torque and the previously calculated supporting torque 4 are combined with each other in an interface 7 to effect control of the steering assistance 2, according to an exemplary embodiment.

The calculation of an actual control torque 8, with which the steering assistance 2 is ultimately controlled, is based upon a continuous characteristic field control that depends upon the current driving dynamics data 9 of the vehicle. This is further discussed in detail with reference to FIG. 3.

Figure 3:
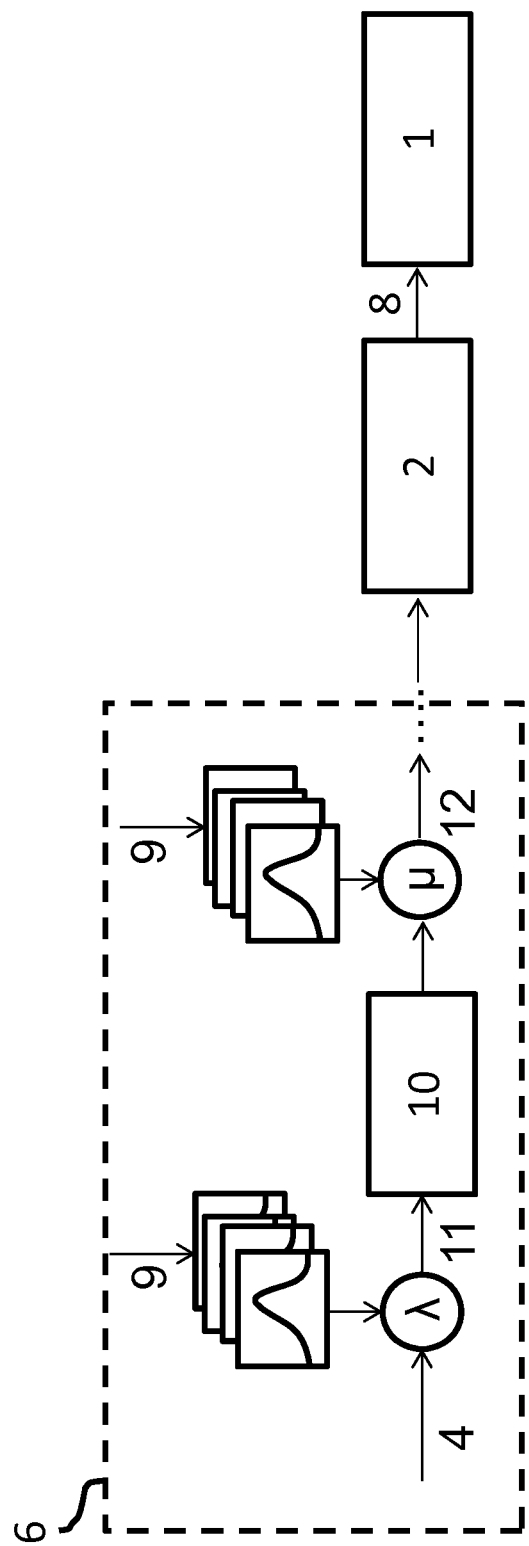
FIG. 3 depicts a more detailed view of a portion of the process of FIG. 2.

FIG. 3 depicts a correction section 6 in further detail. As shown in the exemplary embodiment of FIG. 3, the calculated supporting torque 4 is supplied as input to the correction section 6 and the calculated supporting torque is weighed. For example, the calculated supporting torque is weighed by a factor λ. According to an exemplary embodiment, the factor λ is derived from at least one value of the current driving dynamics data 9 of the vehicle 1. The current driving dynamics data 9 comprises, for example, vehicle speed, lateral acceleration, yaw rate, steering angle, rate of change of the steering angle, the steering torque or the torque in a steering rod, and/or other driving dynamics data familiar to one of ordinary skill in the art.

According to an exemplary embodiment, the factor λ is a product of arbitrary complex functions of the driving dynamics data 9, each of which comprises a single variable. The factor λ can be as follows:

Factor $\lambda = f1(SWA)*f2(Vx)* \ldots *fi(xi)*fn(x)$

Here, "fi(xi)" represent arbitrary complex functions of the recorded driving dynamics data, each with a single variable, with "i" ranging from 1 to n. According to an exemplary embodiment, the highest value of the factor is normalized to "1," wherein all functions then essentially adopt the value "1."

As depicted in the exemplary embodiment of FIG. 3, the correction section 6 comprises a control system 10. The control system 10 comprises a single input and a single output, according to an exemplary embodiment. For example, the control system 10 is designed to receive an input signal 11 representing the calculated supporting torque 4 weighed with the recorded driving dynamics data 9. According to an exemplary embodiment, input signal 11 represents the calculated supporting torque 4 already weighed by the factor λ, which is used by the control system 10 to calculate a correcting torque, which is weighed by another additional factor. For example, the input signal 11 is used by the control system 10 to calculate a correcting torque 12, which is weighed by a factor μ. According to an exemplary embodiment, the additional factor μ is derived from at least one value of the respective current driving dynamics data 9. According to an exemplary embodiment, the control system 10 can be reset to its original value based upon the driving dynamics data 9. The correcting torque 12 may be used as a basis to calculate the actual control torque 8. For example, the correcting torque 12 may be summed with the calculated supporting torque 4, such as at interface 7 in FIG. 2, and the sum used as a basis to calculate the actual control torque 8.

The control system 10 may be implemented as an averaging function or as an integrator, according to an exemplary embodiment. For example, the control system can be defined according to the following function:

$$Tpd(t+1)=Tpd(t)+K*Tw(t)$$

Here "Tpd" represents an internal state of the control system 10, "Tw" represents the previously calculated supporting torque weighed with the factor λ, "K" represents an arbitrary parametric function, such as, for example, a multiplying factor, and "t" defines the respective current time and "t+1" represents the next discrete time step, according to an exemplary embodiment.

Once the correcting torque has been calculated according to the exemplary embodiments described above, the correction section 6 outputs an output signal representing the calculated correcting torque 12, which is superimposed with the supporting torque 4, such as at interface 7 in FIG. 2, with the result being used as a control torque 8 to control the steering assistance 2.

The various exemplary embodiments described herein for improving the straight running of a vehicle are not limited to the measures and embodiments disclosed herein, but of course also include other measures and embodiments with the same effect. Further, the various exemplary embodiments of methods and steering systems described herein for supporting the straight running of a vehicle may be utilized in an associated vehicle. The resulting advantages previously explained in connection with the methods and steering systems of the various exemplary embodiments described herein accordingly apply to a vehicle equipped with a steering system contemplated by the various exemplary embodiments described herein.

The method described above can be performed in one or more devices of the vehicle. For example, the method can be performed by a control device of a steering system, such as a central control unit (not shown) or controller. The control device can be implemented within any element of the steering system, such as a control unit. Alternatively, the control device can be a separate device from any of the above-described steering system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for supporting a straight running of a vehicle that comprises a steering system with active steering assistance system, comprising:
    calculating a supporting torque based in part on a steering torque applied to a steering wheel of the vehicle;
    progressively calculating the supporting torque based in part on the calculated supporting torque by weighting the supporting torque with a first factor based on driving dynamics of the vehicle;
    calculating a correcting torque based in part on the progressively calculated supporting torque by weighting the correcting torque with a second factor based on the driving dynamics of the vehicle; and
    controlling the active steering assistance system based on a control torque calculated by superimposing the supporting torque with the correcting torque.

2. The method as claimed in claim 1, wherein calculating the correcting torque further comprises using continuous characteristic field control that depends upon current driving dynamics data of the vehicle.

3. The method as claimed in claim 1, wherein at least one of the first factor and the second factor is calculated as a product of at least one arbitrary complex function of the driving dynamics data, with each function comprising a single variable.

4. A steering system to support a straight running of a vehicle, the steering system comprising:

an active steering assistance system;

a support torque section configured to calculate a supporting torque based on a steering torque applied to a steering wheel of the vehicle and on a first weighting factor based on driving dynamics of the vehicle; and a correction section configured to calculate a correcting torque on a basis of a progressively calculated supporting torque and on a second weighting factor based on the driving dynamics of the vehicle;

wherein the active steering assistance is configured to be controlled on the basis of a control torque comprising a superimposition of the supporting torque with the correcting torque.

5. The steering system as claimed in claim 4, wherein the correction section is operatively coupled with at least one sensor that detects driving dynamics data of the vehicle.

6. The steering system as claimed in claim 5, wherein the correction section comprises a control system having a single input and a signal output, wherein the control system is configured to receive a weighed supporting torque that has been weighed with the driving dynamics data and is configured to calculate the correcting torque based on the weighed supporting torque.

7. The steering system as claimed in claim 6, wherein the control system is configured to be reset to an original value.

8. A vehicle comprising a steering system as claimed in claim 4.

9. A steering system to support a straight running of a vehicle, the steering system comprising:

a support torque section configured to calculate a supporting torque based on a steering torque applied to a steering wheel of the vehicle;

a correction section configured to calculate a correcting torque at least in part by weighting the calculated supporting torque according to a probability of a driver intending to guide the vehicle along a straight path, the probability factor being based on driving dynamics data of the vehicle, wherein the correction section is operatively coupled with at least one sensor that detects the driving dynamics data;

an interface configured to superimpose the correcting torque with the calculated supporting torque; and an active steering assistance system configured to be controlled on the basis of a control torque to support the straight running of the vehicle, wherein the control torque is based upon the superimposed correcting torque and the calculated supporting torque.

10. The steering system of claim 9, wherein the correction section is configured to receive the calculated supporting torque and weigh the calculated supporting torque with a first factor to calculate the correcting torque.

11. The steering system of claim 10, wherein the first factor is based upon the driving dynamics data.

12. The steering system of claim 10, wherein the correction section comprises a control system configured to receive the calculated supporting torque weighed by the first factor, calculate the correcting torque based upon the weighed supporting torque, and further weigh the calculated correcting torque with a second factor.

13. The steering system of claim 12, wherein the second factor is based upon the driving dynamics data.

* * * * *